(12) United States Patent
Keightley

(10) Patent No.: US 9,120,162 B2
(45) Date of Patent: Sep. 1, 2015

(54) HOLE SAW WITH INTERCHANGEABLE CUTTING BLADES

(76) Inventor: Kym John Keightley, Fairview Park (AU)

(*) Notice: Subject to any disclaimer, the term of this patent is extended or adjusted under 35 U.S.C. 154(b) by 1380 days.

(21) Appl. No.: 12/514,902

(22) PCT Filed: Nov. 14, 2007

(86) PCT No.: PCT/AU2007/001748
§ 371 (c)(1),
(2), (4) Date: Aug. 18, 2009

(87) PCT Pub. No.: WO2008/058329
PCT Pub. Date: May 22, 2008

(65) Prior Publication Data
US 2010/0080665 A1    Apr. 1, 2010

(30) Foreign Application Priority Data
Nov. 14, 2006    (AU) ................ 2006906340

(51) Int. Cl.
*B23B 51/04* (2006.01)
*B23B 51/05* (2006.01)

(52) U.S. Cl.
CPC ......... *B23B 51/0466* (2013.01); *B23B 51/0433* (2013.01); *B23B 51/05* (2013.01); *Y10T 408/895* (2015.01)

(58) Field of Classification Search
CPC ............ Y10T 408/895; Y10T 40/8957; Y10T 408/896; B23B 51/04; B23B 51/0433; B23B 51/0466; B23B 51/05
USPC .......................................... 408/204, 206, 207
IPC ............................................ B23B 51/04, 51/05
See application file for complete search history.

(56) References Cited

U.S. PATENT DOCUMENTS 3,382,743 A * 5/1968 Trevathan ...................... 408/145
3,854,840 A * 12/1974 Miyanaga ..................... 408/204
4,072,441 A * 2/1978 LaPointe ....................... 408/204
5,167,475 A * 12/1992 Miyanaga ..................... 408/204

FOREIGN PATENT DOCUMENTS

JP    59107815 A  *  6/1984
JP    02167613 A  *  6/1990
JP    04075812 A  *  3/1992

* cited by examiner

*Primary Examiner* — Daniel Howell
*Assistant Examiner* — Michael Vitale
(74) *Attorney, Agent, or Firm* — Weiner & Burt, PC.; Irving M. Weiner; Pamela S. Burt

(57) ABSTRACT

A hole saw having a central body portion adapted to receive a hole saw blade portion. The body and the blade have correspondingly shaped apertures and lugs that co-operate together to hold the blade in place. A locking means further assists in ensuring that the blade remains locked to the body and includes a sliding klatch that engages an aperture in the blade and the body and is itself locked in place to thereby lock the blade to the body.

2 Claims, 12 Drawing Sheets

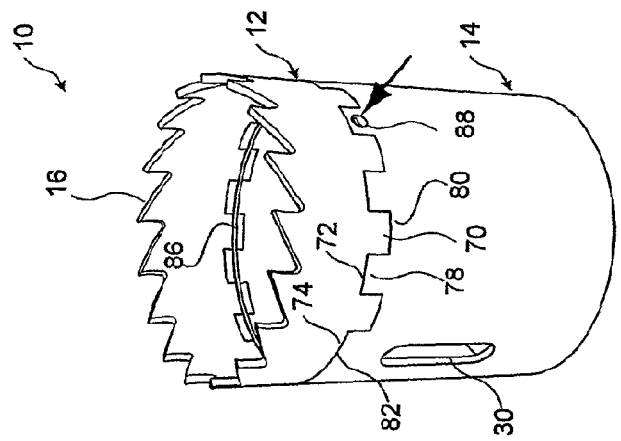
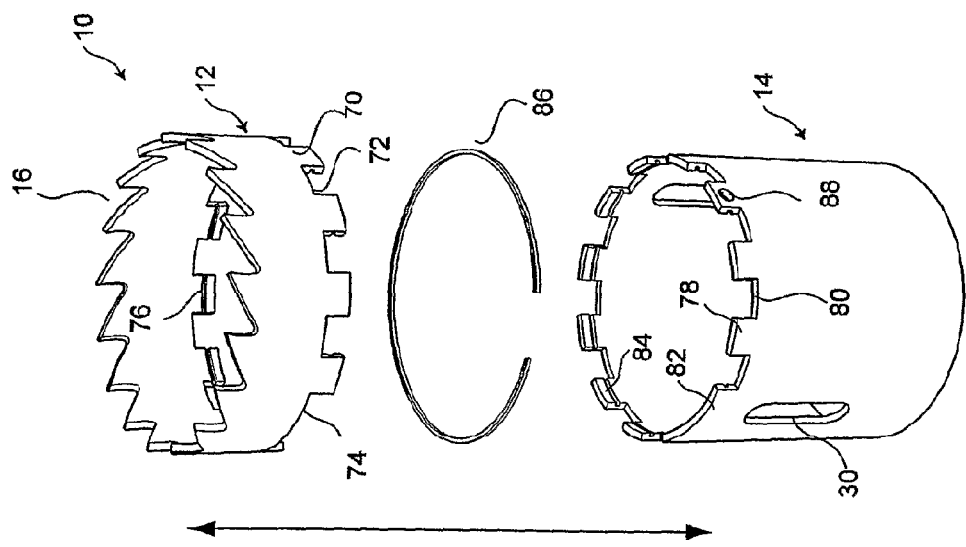

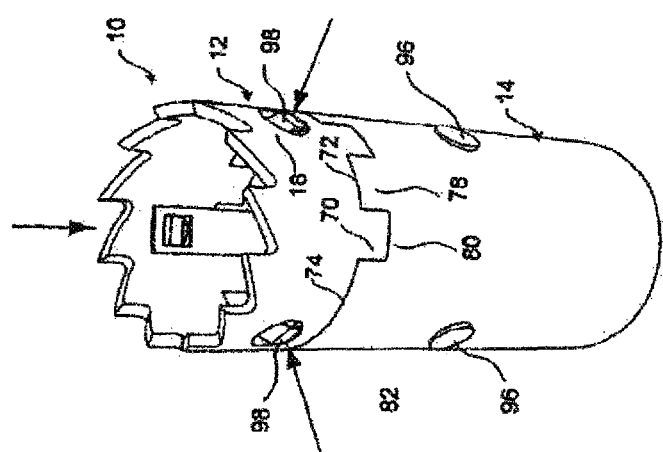
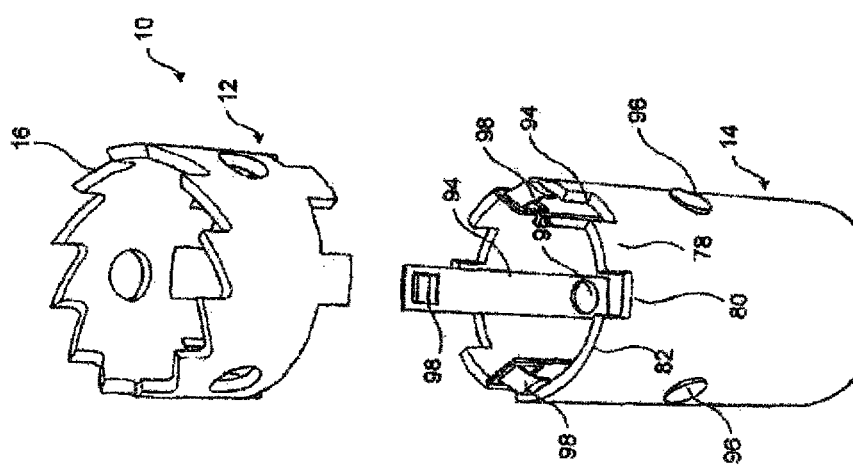

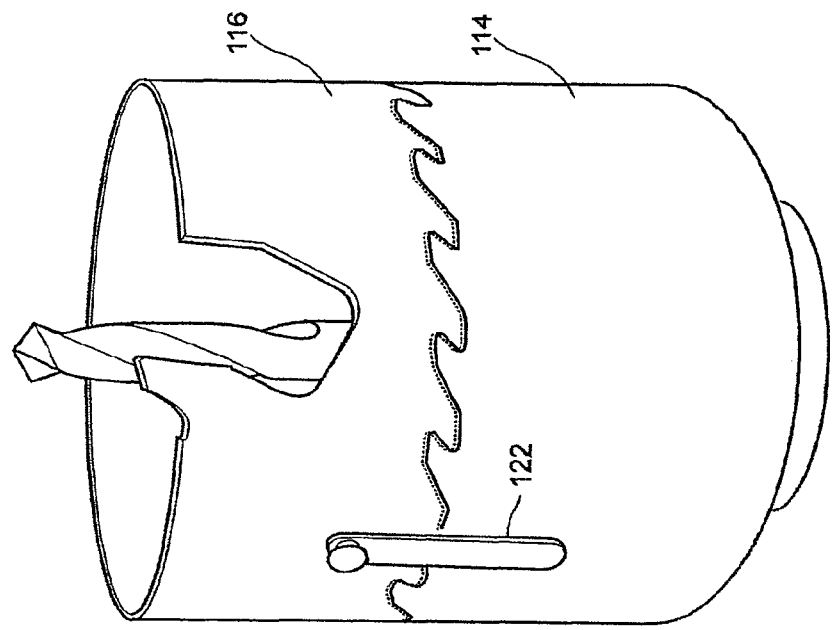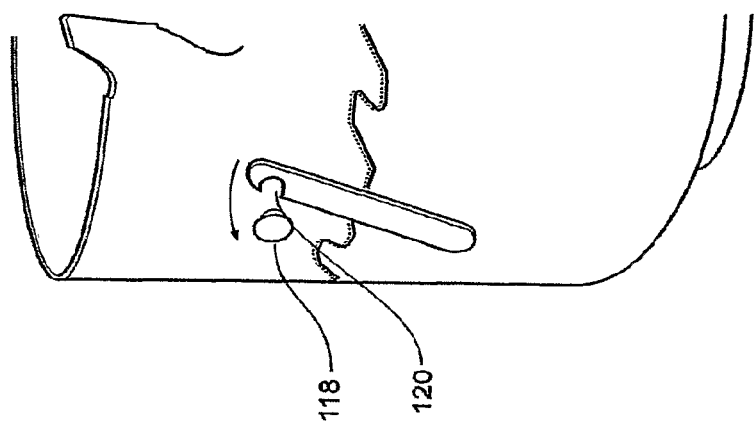
Fig 13

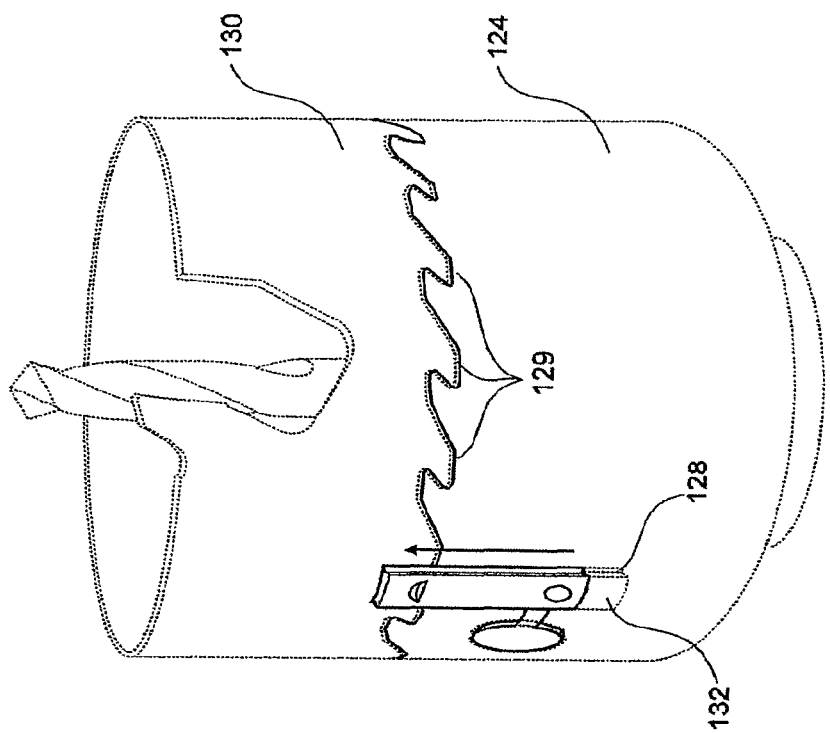
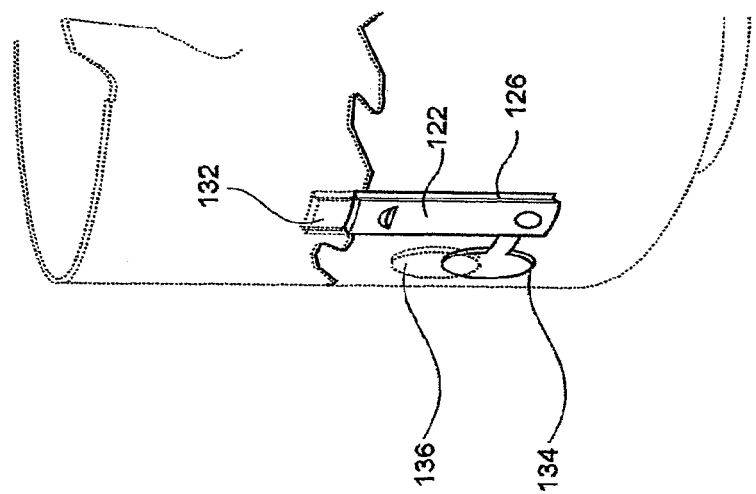
Fig 14

HOLE SAW WITH INTERCHANGEABLE CUTTING BLADES

FIELD OF THE INVENTION

The present invention relates to a hole saw with interchangeable cutting or drilling blades. In particular, a hole saw adapted to receive a plurality of cutting blades of different cutting configurations.

BACKGROUND OF THE INVENTION

Hole saws are a very widely used tool for many applications. Typically a hole saw includes a flat solid base that is locked by a drill, the base providing support for the hole saw. Some bases include multiple diameter grooves adapted to accommodate hole saws of different diameters. Typically these bases, with a plurality of concentric grooves, are of a diameter greater than the hole saw blade and as a result drilling depth is limited to the length of the hole saw body portion. This limitation restricts the possible uses of the hole saw and possible surfaces able to be drilled.

Other hole saws are single sized, overcoming the above-mentioned problem of a larger diameter base but requiring the user to change the entire hole saw for each application. A user with a single sized hole saw needs to replace the hole saw for each surface being drilled as well as for each different diameter hole. The removal and installation of hole saw bodies for each new application or following the failure of a hole saw blade is troublesome, labour intensive, and time consuming.

Holes saw blades use different cutter materials and configurations to more effectively cut the surface being drilled. For example, serrated carbide tipped hole saws are generally used to drill harder and more abrasive surfaces than is possible with a regular steel blade. Some composite woods are more effectively cut with a different blade configuration and are best cut with a single tooth carbide tipped cutting element. Abrasive materials such as glass, ceramics, stone, asbestos and some plastic surfaces also require different cutting materials and configuration of the hole saw blade. A diamond or carbide grit encrusted blade is typically used in these applications. As each application may require a different hole saw blade configuration, the user is required to maintain an inventory of different hole saws for each surface to be drilled and each diameter of hole, inclusive of back up hole saw bodies in the event of blade failure. Such a large inventory is both cumbersome and expensive.

It is therefore an object of the present invention to overcome the aforementioned problems and to provide the public with a useful alternative.

SUMMARY OF THE INVENTION

The present invention provides a hole saw including a base adapted to engage an arbor, a blade including a cylindrical skirt extending longitudinally from the base, the skirt divided into two parts along the longitudinal axis, the parts releasably lockable to each other, the first part coupled to the base and the second part including a cutting means whereby when the parts are locked to each other they are aligned to the longitudinal axis of the hole saw; at least one locking member moveable from a first locked position to a second unlocked position whereby when the locking member is in a first lock position, the first part cannot be removed from the second part, and when said locking member is in the second unlock position, the first part can be removed form said second part.

The present invention also provides a hole saw including a base adapted to engage an arbor and extending therefrom a cylindrical blade having at one end a cutting face, said cylindrical blade further comprising a radial slit about its circumference said radial slit extending through the cylindrical blade separating it into two sections, the first section being a cutting tip cylinder and the second being a support cylinder that is attached to the base.

The present invention further provides a connector assembly including a base extending therefrom a cylindrical skirt the cylindrical skirt including a radial slit about its circumference said radial slit extending through the cylindrical skirt separating it into two sections, the first section being a tool cylinder and the second being a support cylinder that is attached to the base, the support cylinder including a number of circumferential teeth adapted to engage correspondingly shaped cavities in the tool cylinder.

The present invention also provides a hole saw including a base adapted to engage an arbor and extending there from a cylindrical blade having at one end a cutting face, said cylindrical blade further comprising a radial slit about its circumference said radial slit extending through the cylindrical blade separating it into two sections, the first section being a cutting tip cylinder and the second being a support cylinder that is attached to the base.

Therefore in one form of the invention there is proposed a hole saw including:
a hole saw body portion; and
a hole saw blade portion, wherein said hole saw blade portion is removably attached to said hole saw body portion.

Preferably said hole saw blade portion includes at one end a cutting blade and at the other end an engagement means.

Preferably said hole saw body portion includes at one end an attachment means adapted to receive said engagement means of the hole saw blade and at the other end a plurality of bores including at least a central bore.

Preferably said engagement means includes at least one lug extending longitudinally from the hole saw blade portion.

Preferably said central bore is adapted to receive a drill bit, wherein said drill bit extends through and beyond said hole saw blade portion.

In a preferred embodiment said engagement means of the hole saw blade portion is adapted to be received by the hole saw body portion attachment means rotatably from a first to a second position, wherein said first position the hole saw blade portion is freely insertable and removable from the hole saw body portion and in said second position at least one said extending lug is adapted to be retained by said attachment means thereby locking the hole saw blade to the hole saw body.

In another embodiment said engagement means of the hole saw blade portion is adapted to be received by the hole saw body portion attachment means using an interference fit to retain at least one said extending lug with said attachment means.

In a further embodiment said hole saw body portion further includes at least one retention clip longitudinally slidable from a first to a second position, wherein said first position the hole saw blade portion is freely insertable and removable from the hole saw body portion and in said second position said retention clip extends into said hole saw blade portion thereby locking the hole saw blade to the hole saw body.

In preference said retention clip does not extend radially out from the hole saw body portion.

In a still further form of the invention said hole saw blade portion and said hole saw body portion further include a annular groove adapted to retain a C clip, wherein said C clip is inserted into said annular groove when said hole saw body portion and said hole saw blade portion are abutted together thereby locking the hole saw blade to the hole saw body.

In preference said C clip does not protrude radially from the hole saw body portion or the hole saw blade portion.

In a still further for of the invention said hole saw body portion further includes at least one locking strip projecting longitudinally from the hole saw body portion at one end and attached to said hole body portion at the other end, wherein said locking strip is biased from a first to a second position and includes a protrusion adapted to be received by a corresponding aperture in said hole saw blade portion thereby locking the hole saw blade portion to the hole saw body when said biased locking strip is in the first position.

An advantage of such a interchangeable hole saw blade arrangement is that a hole saw blade may be rapidly removed and reattached.

Still a further advantage is that by utilising such a removably attachable hole saw blade portion a user requires less room to store a plurality of hole saw blades for different applications.

Still a further advantage is that said hole saw body can be used with commonly available hole saw mandrels.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings:

FIG. 7a illustrates a perspective view of a hole saw body and a hole saw blade in a disengaged position;

FIG. 7b illustrates a perspective view of a hole saw body and a hole saw blade in a locked position;

FIG. 11a illustrates a perspective view of a hole saw body and a hole saw blade in a disengaged position;

FIG. 11b illustrates a perspective view of a hole saw body and a hole saw blade in a locked position;

FIG. 13 illustrates a perspective view of a hole saw body and an alternate locking means of the hole saw blade;

FIG. 14 illustrates a perspective view of a hole saw body and a further locking means of the hole saw blade;

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention.

Figure 1C:
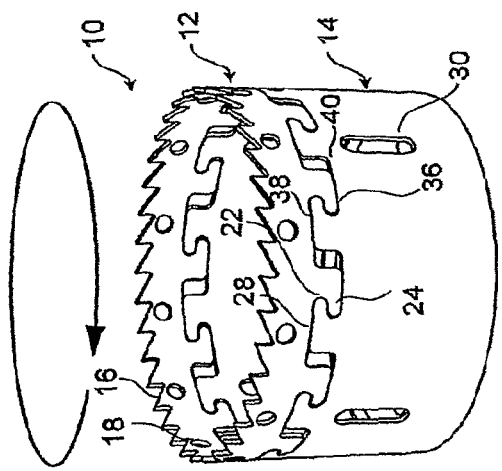
FIG. 1c illustrates a perspective view of a hole saw body and a hole saw blade in a locked position.
Figure 1B:
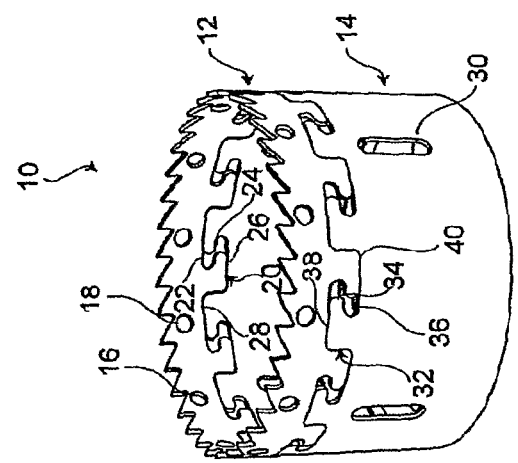
FIG. 1b illustrates a perspective view of a hole saw body and a hole saw blade in an inserted position.
Figure 1A:
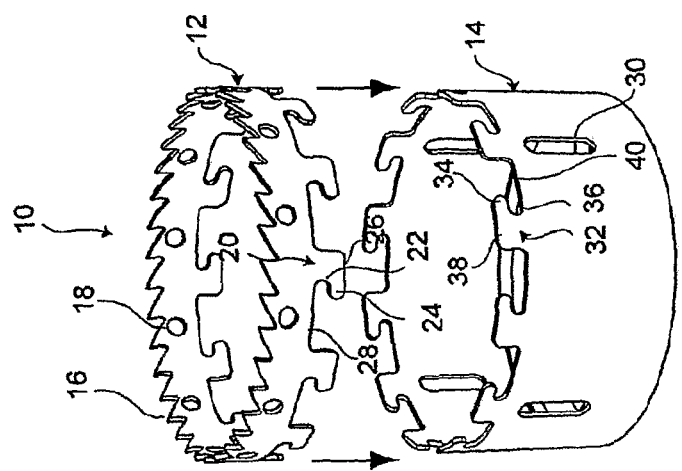
FIG. 1a illustrates a perspective view of a hole saw body and a hole saw blade in a disengaged position.

FIGS. 1a, 1b and 1c show a perspective view of one embodiment of the present invention. Shown in the figures is a hole saw 10 including a hole saw blade portion 12 and a hole saw body portion 14. The hole saw blade 12 includes a cylindrical body with at least one cutting tooth 16 at one end thereof. The arrangement of the cutting teeth differs for each application and in this embodiment shown is a hole saw blade 12 with a plurality of cutting teeth 16. The hole saw blade also contains circular apertures 18 in its cylindrical body to reduce material needed in the construction of a hole saw blade and provide a cooling effect. At the opposite end of the hole saw blade 12 is the engagement means by which the blade is attached to the hole saw body 14.

The engagement lug 20 extends longitudinally from the end of the hole saw blade 12 and shown in this figure is a plurality of repeating dog leg shaped engagement lugs 20, whereby, the lug is comprised of a rounded recessed portion 22, a rounded protruding portion 24, and a substantially flat portion 26. Between each repeating dog leg shaped extending lug 20 is the base 28 of the hole saw blade portion which has a width greater than the width of the substantially flat portion 26 of the extending lug 20.

The hole saw body 14 includes a cylindrical body which may contain slots 30 extending longitudinally along the length of the hole saw body to assist with the removal of the core and reduce the amount of material required for the manufacture of the hole saw body. The hole saw body 14 further includes at one end an attachment means to attach the hole saw body to the hole saw blade 12. The attachment means comprises of an engagement lug 32 extending longitudinally from the end of the hole saw body 14. Shown in this figure is a plurality of repeating dog leg shaped engagement lugs 32, whereby, the lug is comprised of a rounded protruding portion 34, a rounded recessed portion 36, and a substantially flat portion 38. Between each repeating dog leg shaped extending lug 32 is the surface 40 of the hole saw body.

Shown in FIG. 1b is the hole saw blade 12 and the hole saw body 14 abutted together in a first position. In this position the flat portions 26 of the engagement lugs 20 lie substantially parallel with the flat hole saw body surface 40 and the protruding portion 24 of the dog legged engagement lugs has not entered the receded portion 36 of the hole saw body engagement lug 32. In this first position the hole saw body 14 and hole saw blade 12 are removable and insertable and not locked together. FIG. 1c shows the hole saw body 14 and hole saw blade 12 rotated to a second position thereby locking the abovementioned blade to the body. The direction of rotation of the hole saw enables the blade to be retained during use. Such an attachment means may also utilise an interference fit to further retain the blade to the body.

Figure 2:
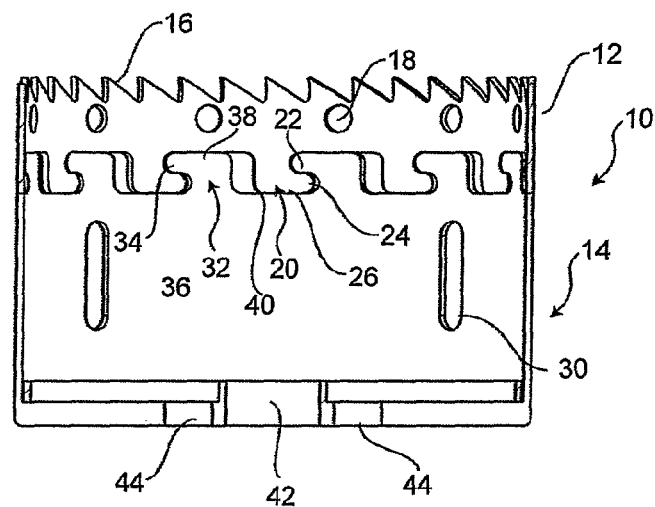
FIG. 2 illustrates a cross sectional view of a hole saw body and a hole saw blade in a locked position.
Figure 3:
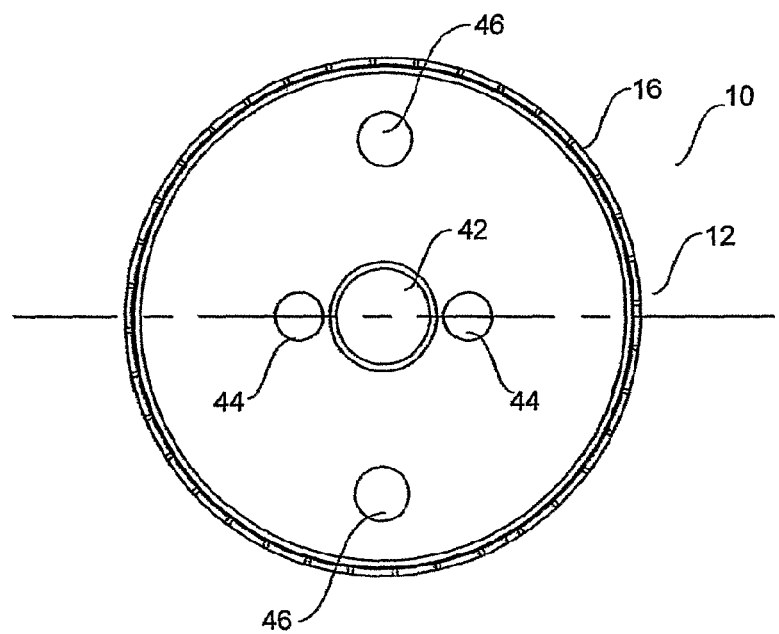
FIG. 3 illustrates a top view of a hole saw body and a hole saw blade in a locked position.

FIG. 2 illustrates a cross sectional view of the hole saw body portion 14 and the hole saw blade portion 12 locked together. FIG. 3 illustrates the same arrangement in a top view. Shown in these figures, at the opposite end to the hole saw blade portion, is the means of fixing the hole saw body 14 to a mandrel (not shown). Also, a central bore 42 is adapted to receive a drill bit (not shown) wherein the drill bit extends through and beyond the hole saw blade portion 12 to guide the hole saw. Holes 44 and 46 are adapted to be a component of the arrangement used to fix the hole saw body 14 with a base or mandrel (not shown).

Figure 4:
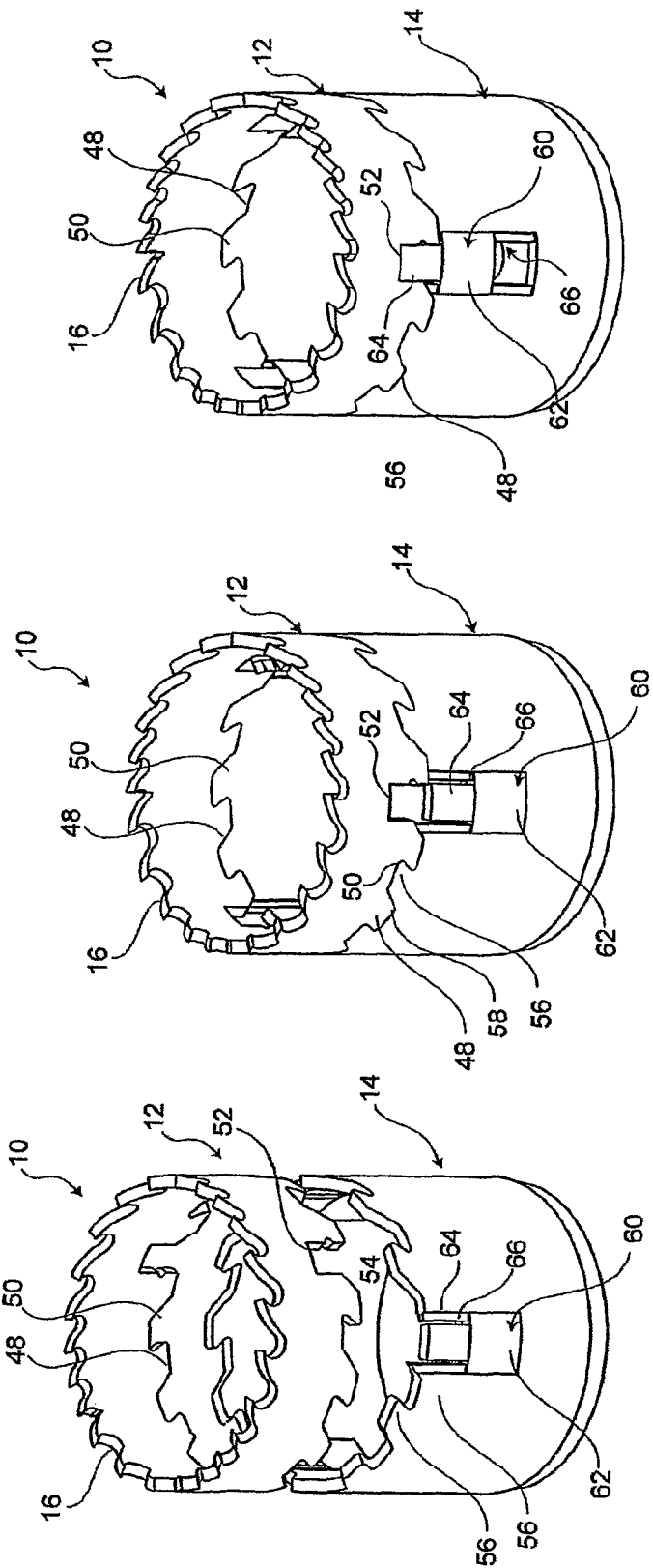
FIG. 4a illustrates a perspective view of a hole saw body and a hole saw blade in a disengaged position.
FIG. 4b illustrates a perspective view of a hole saw body and a hole saw blade in an inserted position.
FIG. 4c illustrates a perspective view of a hole saw body and a hole saw blade in a locked position.

FIGS. 4a, 4b and 4c illustrate an alternative embodiment of the present invention. The present invention includes further means of retaining the hole saw blade portion to the hole saw body portion. In this embodiment the hole saw blade portion 12 includes at one end at least one cutting element 16 and at the other end an engagement means by which the blade is attached to the hole saw body 14.

The engagement means on the hole saw blade 12 further includes at least one engagement lug 48 extending longitudinally from the flat edge 50 of the hole saw blade portion 12. Shown in this figure is a plurality of repeating teeth shaped engagement lugs 48 whereby the lug projects at an acute angle from the hole saw blade portion 12 with the angle of the leading edge of the lug 48 being greater than the angle of the trailing edge. The hole saw blade portion 12 further includes at least one substantially rectangular recession 52 with an angular depression 54 approximately about half way up the side wall of the rectangular recession. The attachment means on the hole saw body 14 is adapted to receive the abovementioned engagement means in a rotatable manner. The attachment means comprises of a plurality of engagement lugs 56, extending longitudinally from the end of the hole saw body 14, and adapted to be received in the space between the extending hole saw blade lugs 48.

To further retain the hole saw blade 12 to the hole saw body 14, the present embodiment utilises at least one retention clip 60 longitudinally slidable from a first to a second position. This additional retention device safeguards against the blade unintentionally being removed through misuse or rough handling. The retention clip includes a tab 62 which a user asserts force upon to slidably move the retention clip from a first to a second position. In doing so the extension strip 64 is moved up into the recess 52 provided in the hole saw blade 12. A projection 66 is adapted to be received by a depression 54 and ensures that the clip is retained in the second and locking position.

FIGS. 4b and 4c show the hole saw blade 12 and hole saw body 14 rotatably attached with the retention clip 60 in the first and second positions. The first position of the retention clip 60 allows the hole saw blade portion 12 to be inserted and removed from the hole saw body portion 14. In the second position the retention clip extends into the hole saw blade portion recess 52 thereby locking the hole saw blade to the hole saw body.

The retention clip 60 slides along longitudinally extending rails 68. These rails are formed by pressing the steel about the slot used to house the retention clip 60 in order to create a reduced thickness of the rails when compared with the thickness of the hole saw body 14. The reduced thickness of the rails allows the retention clip to be the same thickness as the body and as a result it does not protrude radially from the hole saw body 14. Thus allowing through-drilling applications and does not prevent drilling depth to be limited to only the depth of the hole saw blade portion 12.

Figure 5:
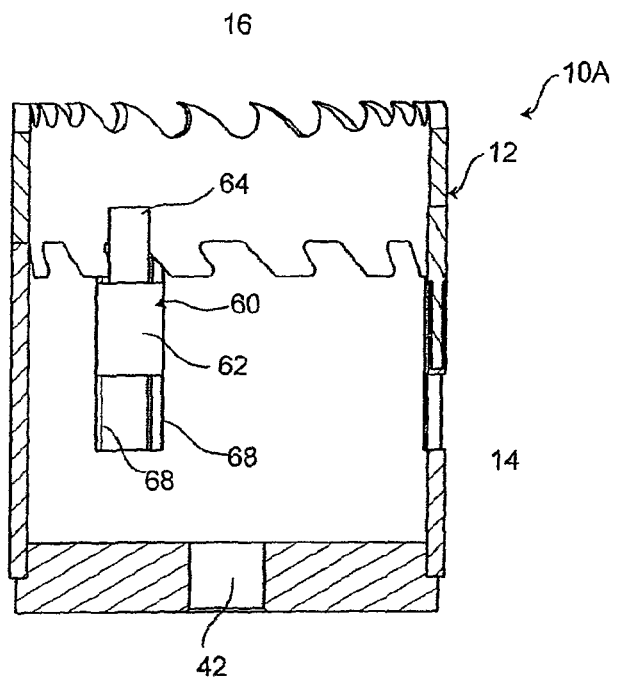
FIG. 5 illustrates a cross sectional view of a hole saw body and a hole saw blade in a locked position.
Figure 6:
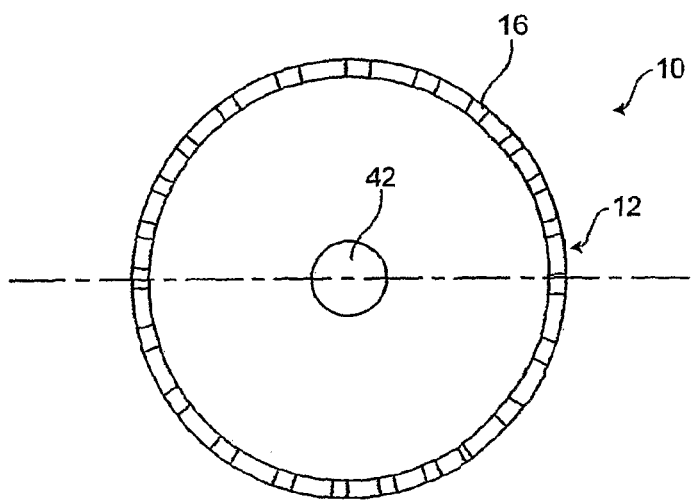
FIG. 6 illustrates a top view of a hole saw body and a hole saw blade in a locked position.

FIG. 5 illustrates a cross sectional view of the hole saw body portion 14 and the hole saw blade portion 12 locked together with the retention clip 60 in the second and locked position. FIG. 6 illustrates the same arrangement in a top view. Also not shown in this figure is the means of fixing the hole saw body to a mandrel or base.

FIGS. 7a and 7b illustrate a further alternative embodiment of the present invention. The present invention includes further means of retaining the hole saw blade portion to the hole saw body portion. In this embodiment the hole saw blade portion 12 includes at one end at least one cutting element 16 and at the other end an engagement means by which the blade is attached to the hole saw body 14.

The engagement means on the hole saw blade 12 further includes at least one engagement lug 70 extending longitudinally from the flat edge 72 of the hole saw blade portion 12. Shown in this figure is a plurality of repeating rectangular lugs and so as to ensure that the width of each lug is the same, at some point on the circular opening there is one larger than uniform gap 74 between the lugs 70. This allows the same tooling equipment to be used in the manufacture of all diameters of hole saw blades and ensures that the hole saw body and the hole saw blade can only be aligned for locking in one particular position.

The hole saw blade portion 12 further includes an annular groove 76 on the inside surface of the extending lugs 70. The attachment means on the hole saw body 14 is adapted to receive the abovementioned lugs 70 in an insertable manner. The attachment means comprises of a plurality of engagement lugs 78 and gaps 80 between these lugs. The lugs extend longitudinally from the end of the hole saw body 14 and are adapted to be received in the space 72 between the extending hole saw blade lugs 70. The hole saw body 14 also includes one larger width lug 82 adapted to be received in the larger width gap 74 of the hole saw blade 12. The hole saw body 14 also further includes an annular groove 84 on the inside surface of the extending lugs 78.

To further retain the hole saw blade 12 to the hole saw body 14, the present embodiment used a C clip 86 inserted into the abovementioned annular grooves 84 and 76. The grooves are aligned once the hole saw blade 12 is inserted into the hole saw body 14 and the C clip is biased so as to push outwards into the aligned grooves thus retaining the blade to the body. To remove the blade from the body and release the C clip, an object is placed into the aperture provided 88 to dislodge the C clip.

Figure 8:
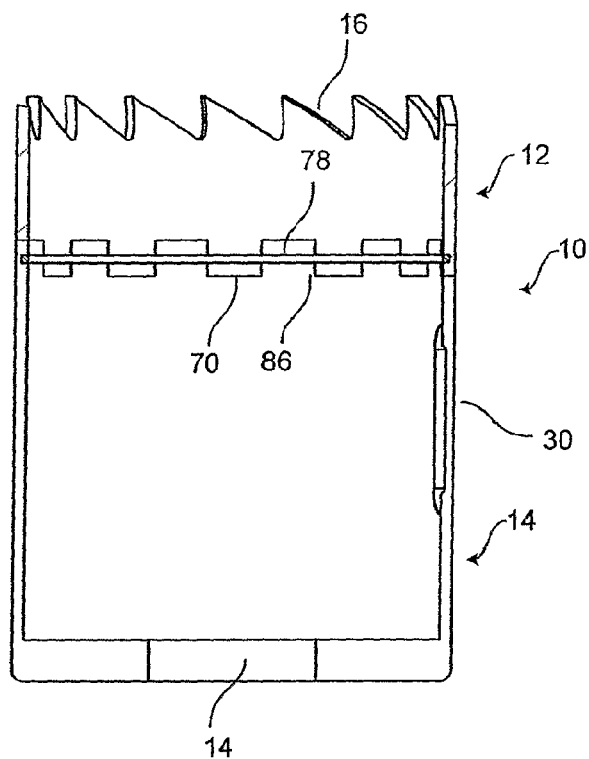
FIG. 8 illustrates a cross sectional view of a hole saw body and a hole saw blade in a locked position.
Figure 9:
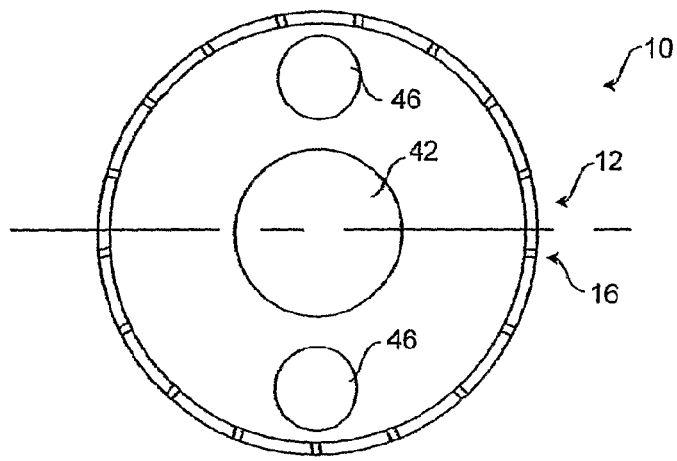
FIG. 9 illustrates a top view of a hole saw body and a hole saw blade in a locked position.
Figure 10:
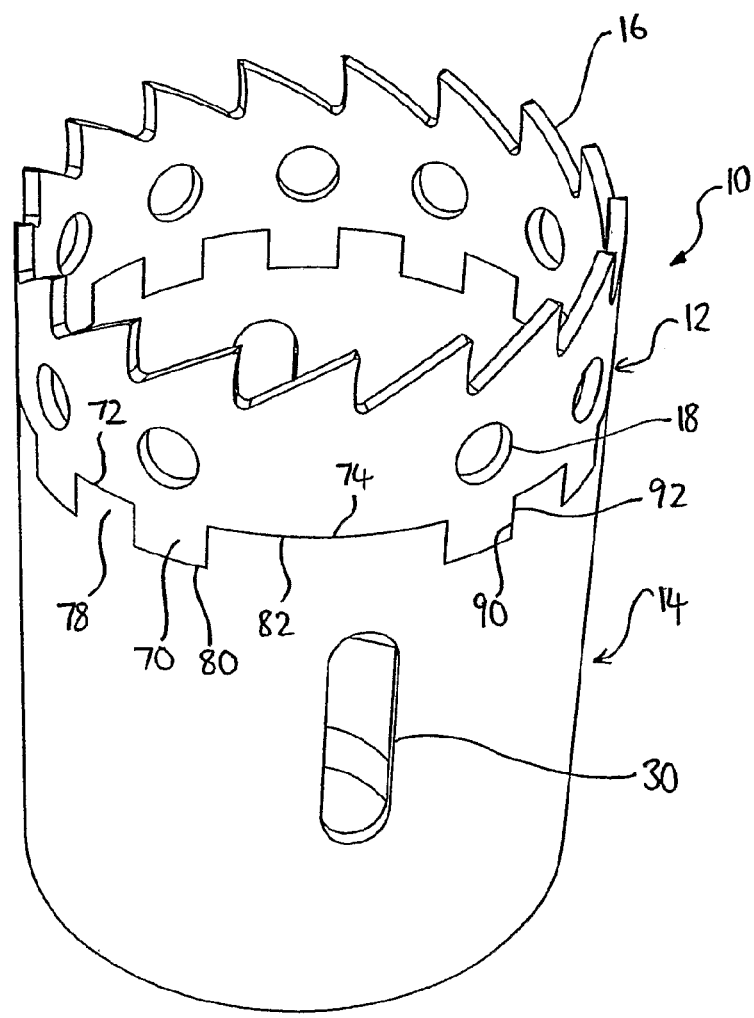
FIG. 10 illustrates a top view of a hole saw body and a hole saw blade in a locked position.

In FIGS. 8 and 9 it is shown that the clip does not extend radially from the hole saw. This allows through-drilling and places no limitation onto the drilling depth possible with such an arrangement FIG. 10 shows the same embodiment as in FIGS. 7a and 7b but without the provision for a C clip. In this embodiment the hole saw blade 12 is attached to the hole saw body portion 14 by an interference fit. The side wall 90 of the extending lug of the blade portion 12 is machined on such an angle, taking into consideration compressive properties of steel, that when it is received by the side wall 92 of the hole saw body lug 78, it is restrained from movement.

FIGS. 11a and 11b illustrate a further alternative embodiment of the present invention. The present invention includes a further means of attaching the hole saw blade portion 12 to the hole saw body portion 14 whilst retaining the same insertion means as shown in FIGS. 7a and 7b.

In this embodiment the hole saw body 14 further includes at least one locking strip 94 projecting longitudinally from the hole saw body 14. Shown in this figure is three locking strips 94, spaced equally about the circular opening of the hole saw body 14. The locking strip 94 is attached at end to the hole saw body 14 with a rivet 96 although alternative methods of attachment may be used, such as a spot weld. At the other end of the locking strip 94 is a protrusion 98 adapted to be received by an aperture 18 on the cylindrical body of the hole saw blade portion 12. Thereby the hole saw blade 12 is locked to the body 14 as the locking strip is biased from a first to a second position and the protrusion 98 is pressed into the aperture 18 whilst in this first position. To remove the blade, the protrusions are pressed inward thus retracting the locking strip 94 to its second position and allowing the hole saw blade 12 to be removed.

Figure 12:
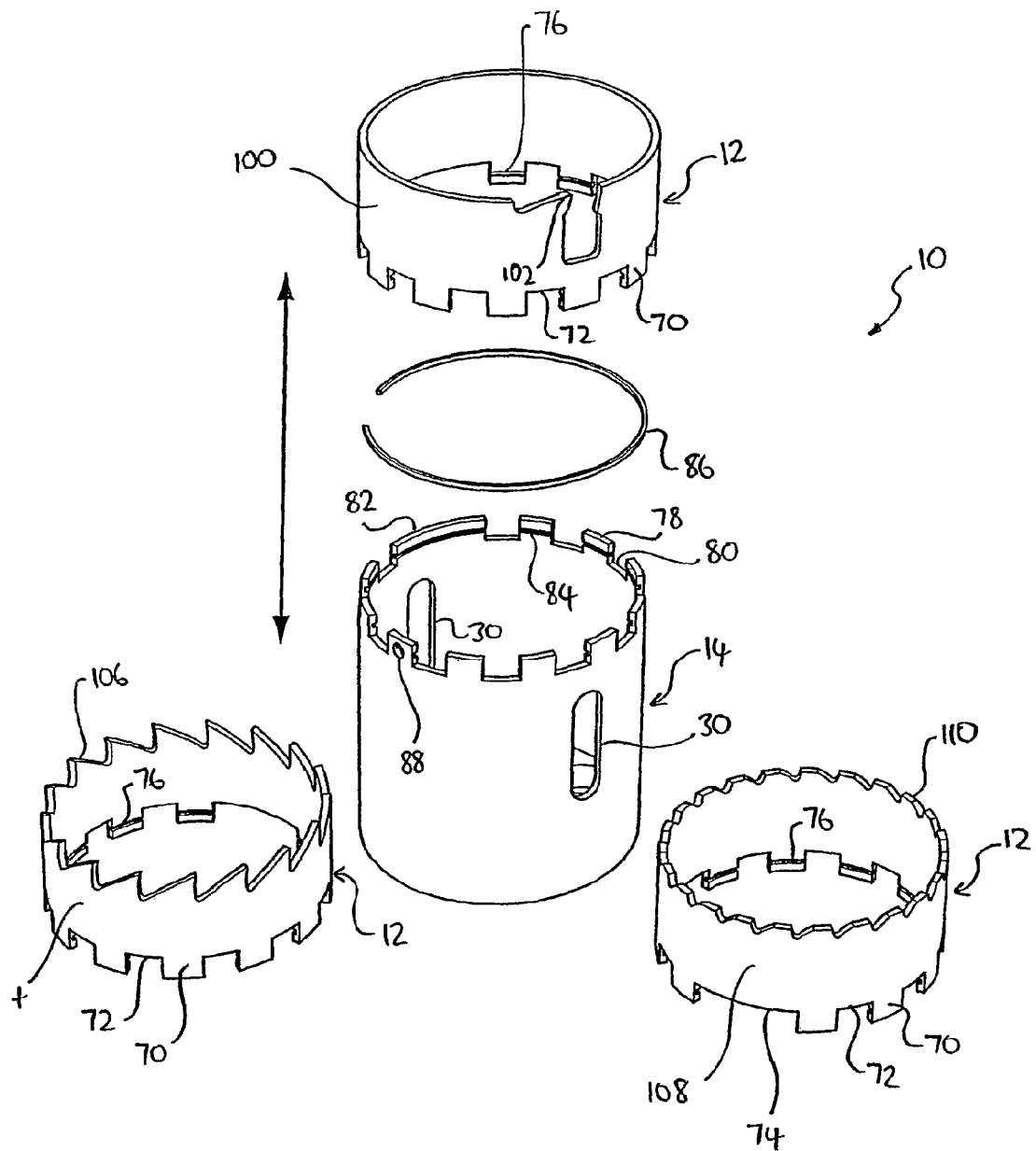
FIG. 12 illustrates a perspective view of a hole saw body and three different hole saw blade configurations.

FIG. 12 shows three different hole saw blade configurations adapted to be attached to a hole saw body 14 using the previous embodiment's method of using a C clip to ensure attachment. Shown is a single tooth hole saw blade 100 with single carbide tipped cutting element 102. Such an arrangement is typically adapted for cutting composite wood surfaces. Also shown is a serrated steel cutter blade 104 with a plurality of teeth 106. These teeth may also be tipped with tungsten carbide or an alternative material for increased durability and the ability to cut different surfaces. Also shown is a diamond or carbide grit encrusted blade 108 with diamond encrusted teeth elements 110 for cutting abrasive materials such as glass, ceramics, stone, asbestos and some plastic surfaces. Other configurations of hole saw blades and cutting elements are available for a user to select depending on the application. The present invention allows the user to store a large array of blade types in a compact and more cost effective manner.

It is important to understand that the present invention teaches a removable hole saw blade that is adapted to be removably attached to a hole saw body. The advantages of this is that the user only needs to have one hole saw body and several blades to be able to cu through a range of materials. Not only is this more space effective and cheaper but it has the result that once a hole saw blade has worn out it can be simply replaced and used with the original hole saw body. This has the effect on saving on materials and thus cost.

There are several features that although not essential are preferred in connection with this hole saw. Thus it is desirable that the locking mechanism that locks the blade to the hole saw body is contained within the footprint of the body, that is, does not protrude in any direction, enabling the hole saw to be used for deep drilling. Nevertheless at times the locking means may indeed protrude (as will be seen in a minute) provided that the operator is aware of the limitations that this may cause in drilling. FIG. 13 illustrates such a locking mechanism where a pivotable lever 112 pivots from hole saw body 114. Hole saw blade 116, that is a wood drilling blade, includes a protruding button 118 that is engaged by cut out 120 in lever 112.

However a preferred locking means is illustrated in FIG. 14. Here a slidable lug whose thickness is the same as the hole saw body 124 includes internally facing grooves 126 that engage a correspondingly shaped protrusion 128 of the hole saw body. The lug is thus restrained in place and can only move up or down to lock and unlock the hole saw blade 130, the lug sliding within aperture 132 defined both by the hole saw body and the hole saw blade. To ensure that once the lug has slid up and engaged blade 130 it remains in place and does not slide down a press stud 134 may be used that engages correspondingly shaped aperture 136 in the hole saw body and prevents the lug from sliding. To unlock the blade from the body the stud 134 may be depressed and then the lug slid down to unlock the blade from the body. Once the hole saw blade is attached to the body the configuration of the various lugs 129 that have non-parallel surfaces to the longitudinal axis of the hole saw body and blade ensures that the blade is firmly locked to the body and cannot disengage itself. Given that the various lugs are typically not symmetrical nor equally spaced around the blade a marker may be used on both the blade and the body (not shown) to assist in the user correctly positioning the blade on the body.

Yet other ways of locking the lug in place may be used including an embodiment where a groove may engage protruding pins and so on. It is not intended to limit the invention to a particular way of causing the locking to occur.

Figure 18:
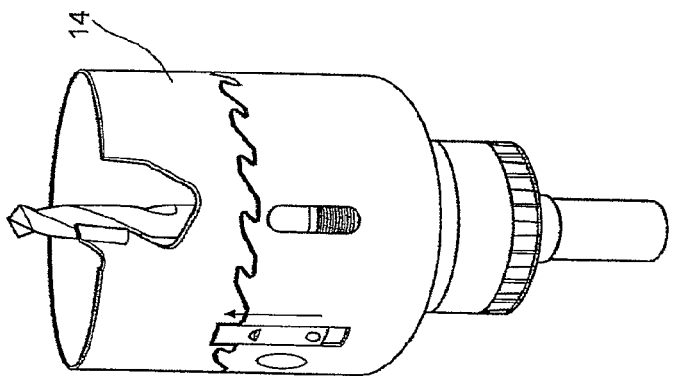
FIG. 18 illustrates the locking means of FIG. 15 with a timber hole saw blade attached and locked thereto.
Figure 17:
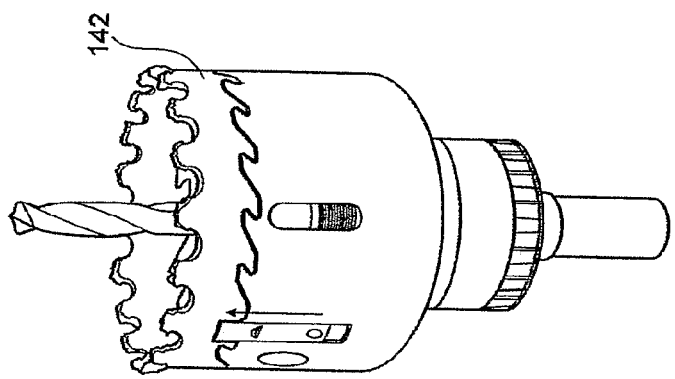
FIG. 17 illustrates the locking means of FIG. 15 with a concrete saw blade attached and locked thereto.
Figure 16:
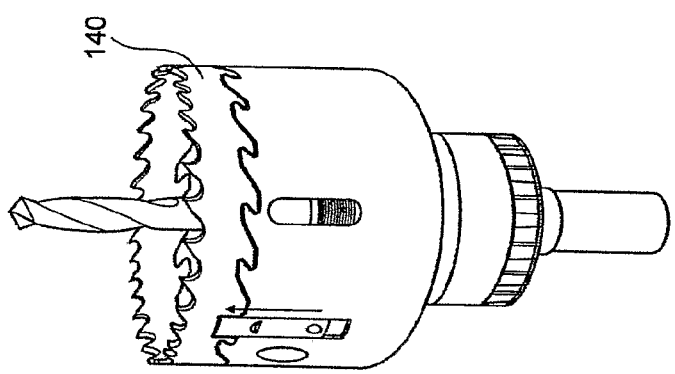
FIG. 16 illustrates the locking means of FIG. 15 with a steel hole saw blade attached and locked thereto.
Figure 15:
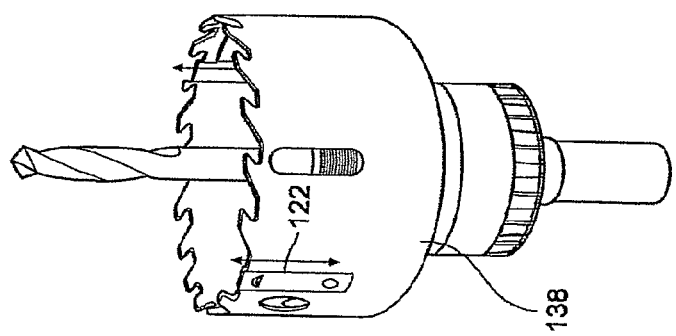
FIG. 15 illustrates the locking means of FIG. 14 without a hole saw blade.

FIGS. 15 through to 18 illustrate in principle the present invention, FIG. 15 illustrating the hole saw body 138 with the locking mechanism 122 of FIG. 14, FIG. 16 illustrating a metal hole saw blade 140 attached to the body, FIG. 17 illustrating a concrete drilling blade 142 attached to the body 138 and FIG. 18 illustrating a timber drilling blade 144 attached to the body.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. A hole saw including a blade and a body:
   the hole saw blade including a cylinder extending longitudinally from a base;
   wherein the hole saw blade is removably attached to the hole saw body; and
   both the hole saw blade and the hole saw body include extending lugs adapted to engage each other and include a circumferential groove extending around the hole saw body and the hole saw blade and adapted to be engaged by a circlip thereby locking the hole saw blade to the hole saw body.

2. A hole saw as in claim 1, wherein:
   the hole saw blade includes cutting teeth extending upwardly at an angle in the direction of rotation of the hole saw blade; and
   the lugs on the hole saw blade extend generally downwardly in the opposite direction thereto.

* * * * *